United States Patent
Chang et al.

(10) Patent No.: US 12,067,989 B2
(45) Date of Patent: Aug. 20, 2024

(54) COMBINED LEARNING METHOD AND APPARATUS USING DEEPENING NEURAL NETWORK BASED FEATURE ENHANCEMENT AND MODIFIED LOSS FUNCTION FOR SPEAKER RECOGNITION ROBUST TO NOISY ENVIRONMENTS

(71) Applicant: IUCF-HYU (INDUSTRY-UNIVERSITY COOPERATION FOUNDATION HANYANG UNIVERSITY), Seoul (KR)

(72) Inventors: Joon-Hyuk Chang, Seoul (KR); Joonyoung Yang, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 344 days.

(21) Appl. No.: 17/600,231
(22) PCT Filed: Mar. 30, 2020
(86) PCT No.: PCT/KR2020/004314
§ 371 (c)(1),
(2) Date: Sep. 30, 2021
(87) PCT Pub. No.: WO2020/204525
PCT Pub. Date: Oct. 8, 2020

(65) Prior Publication Data
US 2022/0208198 A1 Jun. 30, 2022

(30) Foreign Application Priority Data
Apr. 1, 2019 (KR) .................. 10-2019-0037685

(51) Int. Cl.
G10L 17/18 (2013.01)
G10L 17/02 (2013.01)
(Continued)

(52) U.S. Cl.
CPC .............. *G10L 17/04* (2013.01); *G10L 17/02* (2013.01); *G10L 17/18* (2013.01); *G10L 17/20* (2013.01)

(58) Field of Classification Search
CPC ......... G10L 17/04; G10L 17/02; G10L 17/18; G10L 17/20
(Continued)

(56) References Cited

U.S. PATENT DOCUMENTS

| | | | |
|---|---|---|---|
| 2017/0221479 A1 | 8/2017 | Latorre-Martinez et al. | |
| 2020/0111496 A1* | 4/2020 | Itakura | G06N 3/04 |
| 2020/0321008 A1* | 10/2020 | Wang | G06F 21/32 |

FOREIGN PATENT DOCUMENTS

| KR | 10-0526110 B1 | 11/2005 |
|---|---|---|
| KR | 10-2017-0119152 A | 10/2017 |
| KR | 10-1934636 B1 | 1/2019 |

OTHER PUBLICATIONS

Kim, Minseok, "Kernel Method-Based Feature Enhancement and Classification for Robust Speech Recognition and Speaker Recognition", PhD thesis, Department of Computer Statistics, University of Seoul, [Retrieved on Jun. 29, 2020], Retrieved from <http://www.riss.kr/link?id=T12379364>, 118 pages.

(Continued)

*Primary Examiner* — George C Monikang
(74) *Attorney, Agent, or Firm* — Sughrue Mion, PLLC

(57) ABSTRACT

Presented are a combined learning method and device using a transformed loss function and feature enhancement based on a deep neural network for speaker recognition that is robust in a noisy environment. A combined learning method using a transformed loss function and feature enhancement based on a deep neural network, according to one embodiment, can comprise the steps of: learning a feature enhancement model based on a deep neural network; learning a speaker feature vector extraction model based on the deep (Continued)

neural network; connecting an output layer of the feature enhancement model with an input layer of the speaker feature vector extraction model; and considering the connected feature enhancement model and speaker feature vector extraction model as one mode and performing combined learning for additional learning.

14 Claims, 6 Drawing Sheets

(51) Int. Cl.
    *G10L 17/04*     (2013.01)
    *G10L 17/20*     (2013.01)

(58) Field of Classification Search
    USPC ................................ 704/202, 231–233, 259
    See application file for complete search history.

(56) References Cited

OTHER PUBLICATIONS

Kim, Dae Hyun et al., "Performance Comparison of Deep Feature Based Speaker Verification Systems", [Retrieved on Jun. 29, 2020], Retrieved from <http://dx.doi.org/10.13064/KSSS.2015.7.4.009>, 2015, pp. 9-16.

International Search Report of PCT/KR2020/004314 dated Jul. 13, 2020 [PCT/ISA/210].

* cited by examiner

COMBINED LEARNING METHOD AND APPARATUS USING DEEPENING NEURAL NETWORK BASED FEATURE ENHANCEMENT AND MODIFIED LOSS FUNCTION FOR SPEAKER RECOGNITION ROBUST TO NOISY ENVIRONMENTS

CROSS REFERENCE TO RELATED APPLICATIONS

This application is a National Stage of International Application No. PCT/KR2020/004314 filed on Mar. 30, 2020, claiming priority based on Korean Patent Application No. 10-2019-0037685 filed on Apr. 1, 2019.

TECHNICAL FIELD

Embodiments of the present disclosure relate to a deep neural network-based pre-processing technology for speaker recognition robust against noise environments, and more particularly, to a combined learning method and apparatus using deep neural network-based feature enhancement and a modified loss function for speaker recognition robust against noise environments.

BACKGROUND ART

Speaker recognition is based on a speaker feature vector (embedding) extraction technology for extracting a feature containing information of a speaker from utterance having a given length. Recently, a deep neural network is used a lot as a method of extracting a speaker feature vector. In particular, a deep neural network-based speaker feature vector extraction technology has excellent performance even in an environment in which background noise is present because the technology has excellent scalability for a large amount of data having various types of quality.

However, unlike in another voice application such as voice recognition or voice communication, speaker recognition tends to have low performance when being used along with a separate pre-processing technology for removing a noise component from a voice signal contaminated with background noise.

In order to improve performance of an I-vector-based speaker feature vector extraction technology most used before the deep neural network-based speaker feature vector extraction technology was actively researched, a deep neural network-based feature enhancement method was used.

However, conventionally, since a feature enhancement model and an I-vector extraction model are individually trained using a deep neural network-based feature enhancement technology as a pre-processing model of an I-vector-based speaker recognition system, there are problems in that optimization through the joint training of an overall system is impossible and the improvement of speaker recognition performance in an environment in which background noise is present is not certainly ensured by applying the pre-processing model. The reason for this is that the feature enhancement method tends to distort or damage speaker feature information included in a voice signal, in particular, when a noise signal having a low signal to noise ratio (SNR) is present.

Korean Patent Application Publication No. 10-2005-0048214 relates to a method and system for generating a speaker feature vector in such a speaker recognition system, and describes a technology for extracting a feature vector from an input speaker voice signal and performing speaker modeling training and speaker recognition.

DISCLOSURE

Technical Problem

Embodiments of the present disclosure describe a combined learning method and apparatus using deep neural network-based feature enhancement and a modified loss function for speaker recognition robust against noise environments, and more specifically, provide a joint training method and apparatus using a modified loss function as a method for improving performance when a deep neural network-based feature enhancement technology is used as a pre-processing technology of a speaker feature extraction technology.

Embodiments of the present disclosure provide a combined learning method and apparatus using deep neural network-based feature enhancement and a modified loss function for speaker recognition robust against noise environments by combining a deep neural network-based feature enhancement model and a deep neural network-based speaker feature vector extraction model and joint-training the models by using one loss function.

Furthermore, embodiments of the present disclosure provide a combined learning method and apparatus using deep neural network-based feature enhancement and a modified loss function for speaker recognition robust against noise environments, in which training can be performed so that performance of joint training is maximized in a way to perform the joint training by applying a margin when a loss function used in the joint training is constructed.

Technical Solution

A joint training method using deep neural network-based feature enhancement and a modified loss function according to an embodiment may include training a deep neural network-based feature enhancement model, training a deep neural network-based speaker feature vector extraction model, connecting an output layer of the feature enhancement model and an input layer of the speaker feature vector extraction model, and performing joint training in which the connected feature enhancement model and speaker feature vector extraction model are additionally trained by considering the connected feature enhancement model and speaker feature vector extraction model as a single model.

Training a deep neural network-based feature enhancement model may include extracting acoustic features from degraded voice data and clean voice data, using the extracted acoustic features for an input to the feature enhancement model, and training, by using a first loss function, the feature enhancement model so that enhanced acoustic features outputted by passing the extracted acoustic features through the feature enhancement model have values similar to those of previously-prepared clean acoustic features.

Training a deep neural network-based speaker feature vector extraction model may include generating enhanced acoustic features by passing the extracted acoustic features through the feature enhancement model that has learnt all of training datasets, using the enhanced acoustic features for an input to the speaker feature vector extraction model, and training, by using a second loss function, the speaker feature vector extraction model so that speakers are classified in a sequence of acoustic features extracted from utterance having a given length by passing the enhanced acoustic features through the speaker feature vector extraction model.

Training a deep neural network-based speaker feature vector extraction model may include training the speaker feature vector extraction model by using an x-vector model as the speaker feature vector extraction model.

Training a deep neural network-based speaker feature vector extraction model may include extracting, by the x-vector model, information related to speakers from a sequence of acoustic features of a frame unit arranged in a time order through a non-linear operation by using five time-delay neural network (TDNN) layers, extracting a vector having a fixed length from utterance having a given length in a way to calculate and joint together a mean and standard deviation of the sequence of the acoustic features in a time axis in a statistical feature extraction layer, and training, by using a cross-entropy second loss function, the speaker feature vector extraction model so that speakers within a training dataset are classified in the output layer after the mean and standard deviation vector additionally pass through two hidden layers.

Training a deep neural network-based speaker feature vector extraction model may include using, as an x-vector that is a speaker feature vector, an output value before passing through an activation function of the hidden layer located right next to the statistical feature extraction layer after the training is finished.

Performing joint training in which the connected feature enhancement model and speaker feature vector extraction model are additionally trained by considering the connected feature enhancement model and speaker feature vector extraction model as a single model may include connecting the individual feature enhancement model and speaker feature vector extraction model trained using different loss functions, and then generally optimizing, through the joint training, the two feature enhancement model and speaker feature vector extraction model connected by one loss function.

Performing joint training in which the connected feature enhancement model and speaker feature vector extraction model are additionally trained by considering the connected feature enhancement model and speaker feature vector extraction model as a single model may include performing the joint training by modifying the second loss function in a way to subtract a margin, corresponding to a specific constant value, from an output value corresponding to a speaker index of the speaker feature vector extraction model in order to perform the joint training so that a posteriori probability of a speaker is increased.

A joint training apparatus using deep neural network-based feature enhancement and a modified loss function according to another embodiment may include a feature enhancement model training unit configured to train a deep neural network-based feature enhancement model, a speaker feature vector extraction model training unit configured to train a deep neural network-based speaker feature vector extraction model, a joint modeling unit configured to connect an output layer of the feature enhancement model and an input layer of the speaker feature vector extraction model, and a joint training unit configured to perform joint training in which the connected feature enhancement model and speaker feature vector extraction model are additionally trained by considering the connected feature enhancement model and speaker feature vector extraction model as a single model.

The feature enhancement model training unit may extract acoustic features from degraded voice data and clean voice data, may use the extracted acoustic features for an input to the feature enhancement model, and may train, by using a first loss function, the feature enhancement model so that enhanced acoustic features outputted by passing the extracted acoustic features through the feature enhancement model have values similar to those of previously-prepared clean acoustic features.

The speaker feature vector extraction model training unit may generate enhanced acoustic features by passing the extracted acoustic features through the feature enhancement model that has learnt all of training datasets, may use the enhanced acoustic features for an input to the speaker feature vector extraction model, and may train, by using a second loss function, the speaker feature vector extraction model so that speakers are classified in a sequence of acoustic features extracted from utterance having a given length by passing the enhanced acoustic features through the speaker feature vector extraction model.

The speaker feature vector extraction model training unit may train the speaker feature vector extraction model by using an x-vector model as the speaker feature vector extraction model. The x-vector model may extract information related to speakers from a sequence of acoustic features of a frame unit arranged in a time order through a non-linear operation by using five time-delay neural network (TDNN) layers, may extract a vector having a fixed length from utterance having a given length in a way to calculate and joint together a mean and standard deviation of the sequence of the acoustic features in a time axis in a statistical feature extraction layer, and may train, by using a cross-entropy second loss function, the speaker feature vector extraction model so that speakers within a training dataset are classified in the output layer after the mean and standard deviation vector additionally pass through two hidden layers.

The speaker feature vector extraction model training unit may use, as an x-vector that is a speaker feature vector, an output value before passing through an activation function of the hidden layer located right next to the statistical feature extraction layer after the training is finished.

The joint training unit may connect the individual feature enhancement model and speaker feature vector extraction model trained using different loss functions, and may then generally optimize, through the joint training, the two feature enhancement model and speaker feature vector extraction model connected by one loss function.

The joint training unit may perform the joint training by modifying the second loss function in a way to subtract a margin, corresponding to a specific constant value, from an output value corresponding to a speaker index of the speaker feature vector extraction model in order to perform the joint training so that a posteriori probability of a speaker is increased.

Advantageous Effects

According to embodiments of the present disclosure, by combining the deep neural network-based feature enhancement model and the deep neural network-based speaker feature vector extraction model and joint-training the models using one loss function, the combined learning method and apparatus using deep neural network-based feature enhancement and a modified loss function for speaker recognition robust against noise environments can be provided.

Furthermore, according to embodiments of the present disclosure, there can be provided the combined learning method and apparatus using deep neural network-based feature enhancement and a modified loss function for speaker recognition robust against noise environments, in which training can be performed so that performance of joint training is maximized in a way to perform the joint training by applying a margin when a loss function used in the joint training is constructed.

BEST MODE FOR INVENTION

Figure 1:
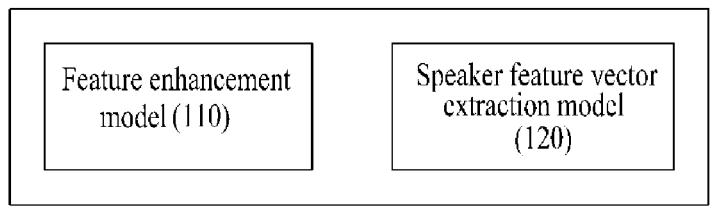
FIG. 1 is a diagram for describing a joint training apparatus using deep neural network-based feature enhancement and a modified loss function according to an embodiment of the present disclosure.

Hereinafter, embodiments of the present disclosure are described with reference to the accompanying drawings. However, the described embodiments may be modified in various other forms, and the scope of the present disclosure is not restricted by the following embodiments. Furthermore, various embodiments are provided to more fully describe the present disclosure to a person having average knowledge in the art. The shapes, sizes, etc. of elements in the drawings may be exaggerated for a clear description.

The present disclosure relates to a combined learning method and apparatus using deep neural network-based feature enhancement and a modified loss function, and may provide a joint training method and apparatus using a modified loss function as a method for improving performance when a deep neural network-based feature enhancement technology as a pre-processing technology of a speaker feature extraction technology.

More specifically, there may be provided a deep neural network-based feature enhancement technology for converting, into clean acoustic features, acoustic features extracted in a frame unit from a voice signal degraded by background noise, a method of joint-training the feature enhancement technology and a deep neural network-based speaker feature vector extraction technology, and a method using a modified loss function to which a margin is added as a method of maximizing an effect of joint training.

FIG. 1 is a diagram for describing a joint training apparatus using deep neural network-based feature enhancement and a modified loss function according to an embodiment of the present disclosure.

Referring to FIG. 1, the joint training apparatus 100 using deep neural network-based feature enhancement and a modified loss function according to an embodiment of the present disclosure may provide a speaker recognition technology robust against noise environments by combining a deep neural network-based feature enhancement model 110 and a deep neural network-based speaker feature vector extraction model 120 and joint-training the models by using one loss function. Moreover, performance of the joint training can be maximized in a way to perform the joint training by applying a margin when a loss function used in the joint training is constructed.

In the present disclosure, a recently suggested deep neural network-based x-vector technology has been used as a speaker feature vector extraction technology. It has been known that the corresponding technology has more excellent performance than the I-vector technology with respect to degraded voice data. In particular, a combination of the deep neural network-based feature enhancement model 110 and the deep neural network-based speaker feature vector extraction model 120 is a model construction method that has never been proposed before. Furthermore, the x-vector technology has an advantage in that joint training with the deep neural network-based feature enhancement model 110 is possible because a deep neural network is used as the speaker feature vector extraction model 120. Furthermore, the training of the x-vector model is performed in a way to classify speakers within a training dataset. In this case, the training may be performed so that performance of the joint training is maximized by applying a margin when a loss function used in the joint training is constructed.

Meanwhile, if the deep neural network-based feature enhancement model and an I-vector-based speaker feature vector extraction model are combined, system optimization through joint training is impossible because the two models have different training algorithms.

Figure 2:
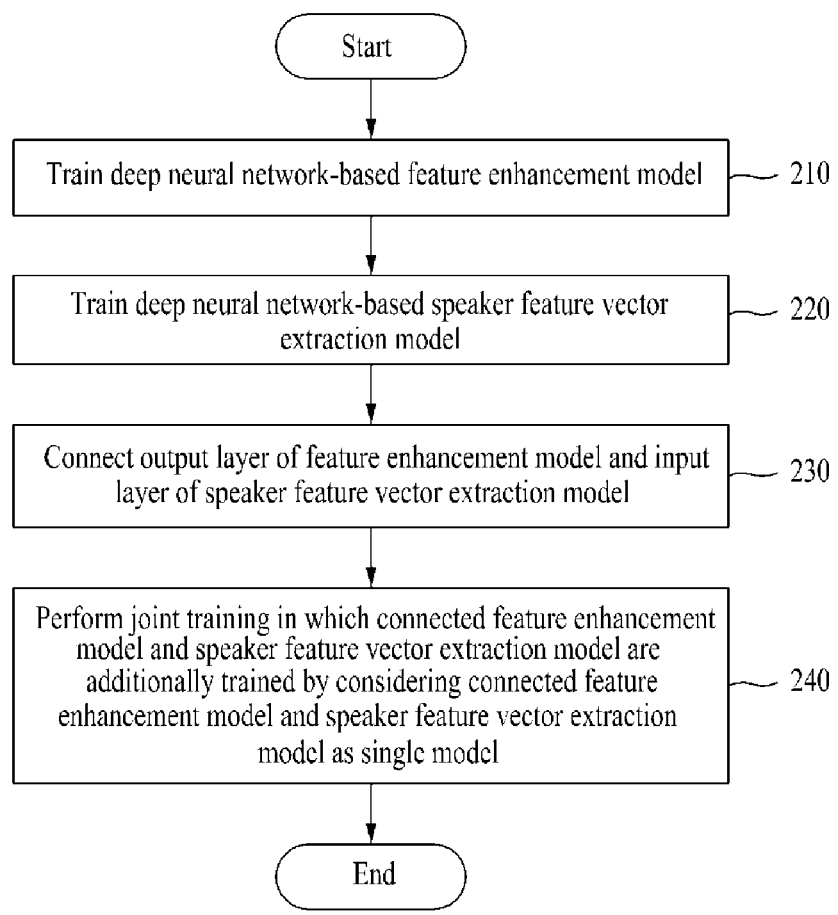
FIG. 2 is a flowchart illustrating a joint training method using deep neural network-based feature enhancement and a modified loss function according to an embodiment of the present disclosure.

FIG. 2 is a flowchart illustrating a joint training method using deep neural network-based feature enhancement and a modified loss function according to an embodiment of the present disclosure.

Referring to FIG. 2, the joint training method using deep neural network-based feature enhancement and a modified loss function according to an embodiment of the present disclosure may include step 210 of training the deep neural network-based feature enhancement model, step 220 of training the deep neural network-based speaker feature vector extraction model, step 230 of connecting the output layer of the feature enhancement model and the input layer of the speaker feature vector extraction model, and step 240 of performing joint training in which the connected feature enhancement model and speaker feature vector extraction model are additionally trained by considering the connected feature enhancement model and speaker feature vector extraction model as a single model.

In this case, step 210 of training the deep neural network-based feature enhancement model may include steps of extracting acoustic features from degraded voice data and clean voice data, using the acoustic features for the input of the feature enhancement model, and training the feature enhancement model by using a first loss function in a way to minimize a mean square error (MSE) so that enhanced acoustic features outputted by passing the extracted acoustic features through the feature enhancement model have values similar to those of previously-prepared clean acoustic features.

Furthermore, step 220 of training the deep neural network-based speaker feature vector extraction model may include steps of generating enhanced acoustic features by passing the extracted acoustic features through the feature enhancement model that has learnt all of training datasets, using the enhanced acoustic features for an input to the speaker feature vector extraction model, and training the speaker feature vector extraction model by using a second loss function so that speakers are classified in a sequence of acoustic features extracted from utterance having a given length by passing the enhanced acoustic features through the speaker feature vector extraction model.

Furthermore, in step 240 of performing joint training in which the connected feature enhancement model and speaker feature vector extraction model are additionally trained by considering the connected feature enhancement model and speaker feature vector extraction model as a single model, after the feature enhancement model and the speaker feature vector extraction model trained using different loss functions are connected into one, the two feature enhancement model and speaker feature vector extraction model connected by one loss function can be generally optimized through joint training. In particular, in order to perform the joint training so that the posteriori probability of a speaker is increased, the joint training may be performed by modifying the second loss function in a way to subtract a margin, corresponding to a specific constant value, from an output value corresponding to a speaker index of the speaker feature vector extraction model.

The joint training method using deep neural network-based feature enhancement and a modified loss function according to an embodiment of the present disclosure may be described using a joint training apparatus using deep neural network-based feature enhancement and a modified loss function according to an embodiment of the present disclosure.

Figure 3:
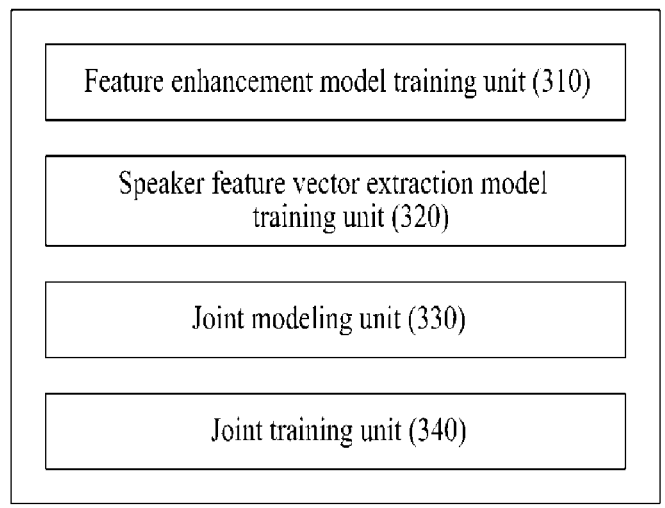
FIG. 3 is a diagram schematically illustrating a joint training apparatus using deep neural network-based feature enhancement and a modified loss function according to an embodiment of the present disclosure.

FIG. 3 is a diagram schematically illustrating a joint training apparatus using deep neural network-based feature enhancement and a modified loss function according to an embodiment of the present disclosure.

Referring to FIG. 3, a joint training apparatus 300 using deep neural network-based feature enhancement and a modified loss function according to an embodiment of the present disclosure may include a feature enhancement model training unit 310, a speaker feature vector extraction model training unit 320, a joint modeling unit 330, and a joint training unit 340.

In step 210, the feature enhancement model training unit 310 trains the deep neural network-based feature enhancement model, and it may extract acoustic features from degraded voice data and clean voice data and use the acoustic features for an input to the feature enhancement model. Furthermore, the feature enhancement model training unit 310 may learn the deep neural network-based feature enhancement model by using a first loss function so that enhanced acoustic features outputted by passing the extracted acoustic features through the feature enhancement model have values similar to those of previously-prepared clean acoustic features.

In step 220, the speaker feature vector extraction model training unit 320 learns the deep neural network-based speaker feature vector extraction model, and it may generate enhanced acoustic features by passing the extracted acoustic features through the feature enhancement model that has leant all of training datasets and use the enhanced acoustic features for an input to the speaker feature vector extraction model. Furthermore, the speaker feature vector extraction model training unit 320 may train the speaker feature vector extraction model by using a second loss function so that speakers are classified from an acoustic feature sequence extracted from utterance having a given length by passing the extracted acoustic features through the speaker feature vector extraction model.

In particular, the speaker feature vector extraction model training unit 320 may use an x-vector model as the deep neural network-based speaker feature vector extraction model. The x-vector model may be trained using a cross-entropy second loss function by extracting information related to speakers from a sequence of acoustic features of a frame unit arranged in a time order through a non-linear operation using five time-delay neural network (TDNN) layers, extracting a vector having a fixed length from utterance having a given length by calculating and jointing together the mean and standard deviation of the sequence of the acoustic features in a time axis in a statistical feature extraction layer, additionally passing the calculated average and standard deviation vector through two hidden layers, and then classifying speakers within a training dataset in an output layer.

After finishing the training, the speaker feature vector extraction model training unit 320 may use, as an x-vector that is a speaker feature vector, an output value before passing through an activation function of a hidden layer located right next to the statistical feature extraction layer.

In step 230, the joint modeling unit 330 may connect the output layer of the feature enhancement model and the input layer of the speaker feature vector extraction model.

In step 240, the joint training unit 340 may perform joint training in which the connected feature enhancement model and speaker feature vector extraction model are additionally trained by considering the connected feature enhancement model and speaker feature vector extraction model as a single model. More specifically, the joint training unit 340 may connect the feature enhancement model and the speaker feature vector extraction model trained using the different loss functions, and may generally optimize the two feature enhancement model and speaker feature vector extraction model connected by one loss function through joint training.

In this case, the joint training unit 340 may joint-train the two feature enhancement model and speaker feature vector extraction model by modifying a second loss function in a way to subtract a margin, corresponding to a specific constant value, from an output value corresponding to a speaker index of the speaker feature vector extraction model in order to train the two models so that the posteriori probability of a speaker is increased.

Performance of speaker recognition when a voice degraded by background noise is inputted in an artificial intelligence speaker used in a household environment, a robot used in an airport, a speaker recognition system of a portable terminal used in an outside environment, etc. can be improved by using the speaker feature vector extraction technology robust against noise environments according to the present disclosure. Furthermore, the joint training scheme proposed in the present disclosure may also be used for the training of an acoustic model trained to identify a state of a phoneme, and thus may help the design of a voice recognizer robust against noise environments.

A combined learning method and apparatus using deep neural network-based feature enhancement and a modified loss function according to an embodiment are described in detail by taking one example.

In step 210, the feature enhancement model training unit 310 may train the deep neural network-based feature enhancement model.

In order to train the deep neural network-based feature enhancement model, the feature enhancement model training unit 310 may first extract acoustic features from degraded voice data and clean voice data. The acoustic feature may be prepared by first dividing a voice signal in a frame unit having a length of 25 ms every 10 ms and extracting a 24-dimension Mel-filter bank energy (MFBE) feature from each voice frame.

In this case, the feature enhancement model is used as a pre-processing model of the speaker feature vector extraction model, and thus may apply some types of processing applied to the acoustic feature without any change when a speaker feature extraction model is constructed prior to training. First, acoustic features extracted from a voice frame including only silence or noise may be removed by applying a voice activity detection algorithm. A window having a length of three seconds or less may be slid with respect to a sequence of the acoustic features extracted from each utterance. The acoustic features may be normalized by subtracting the mean from the acoustic features included in the range of the corresponding window.

The acoustic features on which such processing has been performed may be used in the input stage of the deep neural network-feature enhancement model. The based feature enhancement model may be trained in a way to minimize a mean square error (MSE) so that enhanced acoustic features outputted from the output stage of the feature enhancement model through the deep neural network have values similar to those of previously prepared clean acoustic features as much as possible. A loss function used for the training of the deep neural network-based feature enhancement model may be indicated as in the following equation.

$$L_{FE} = \frac{1}{N}\sum_{n=1}^{N}\|\hat{x}_n(y_{t-\tau}^{t+\tau}; W, b) - x_n\|_2^2 \quad \text{[Equation 1]}$$

wherein N is the size of a mini-batch used for the training. n is the index of training data constituting the mini-batch. $x_n$ is a Mel-filter bank energy (MFBE) feature vector extracted from a clean voice signal, that is, a target for a neural network. $\hat{x}_n$ is an MFBE feature vector estimated through the neural network.

$y_{t-\tau}^{t+\tau}$ is an MFBE feature vector extracted from a degraded voice signal, that is, an input to the neural network. Feature vectors from an n−τ-th frame to an n+τ-th frame are jointed together as one vector and are used along with surrounding components in the time axis. Accordingly, there is an effect in that a clean MFBE feature vector can be more effectively estimated through a neural network. W and b mean sets of weights and bias parameters, respectively, which constitute the neural network.

N is the size of a mini-batch, that is, a unit by which a parameter of the neural network is updated once through training. A value of 64 may be used as N. The feature enhancement model may include three hidden layers having 1,024 hidden units. An activation function used in the hidden layer is a hyperbolic tangent (tan h) function. A linear activation function may be used in the output layer. In the input stage, a total of seven frames may be jointed together using a value of τ=3 and inputted to the neural network. The feature enhancement model is optimized using an ADAM algorithm and may be trained through a learning rate of 1e-3 through 60 epochs.

In step 220, the speaker feature vector extraction model training unit 320 may train the deep neural network-based speaker feature vector extraction model.

In order to train the deep neural network-based speaker feature vector extraction model, the speaker feature vector extraction model training unit 320 may first generate enhanced acoustic features by passing the extracted acoustic features through the feature enhancement model that has learnt all of training data as described above. The enhanced acoustic features may be directly used for an input to the speaker feature vector extraction model.

In this case, an x-vector model may be used as the speaker feature vector extraction model. The x-vector model may play a role to extract information related to speakers from a sequence of acoustic features of a frame unit arranged in a time order through a non-linear operation by using five time-delay neural network (TDNN) layers. A statistics feature extraction (statistics pooling) layer placed after the x-vector model may play a role to extract a vector having a fixed length from utterance having a given length by calculating and jointing together the mean and a standard deviation of the sequence of the acoustic features in the time axis.

After the mean and the standard deviation vector calculated as described above additionally experience two hidden layers, the speaker feature vector extraction model may be trained using a cross-entropy loss function so that speakers within the training dataset are finally classified at the output layer. That is, such a method is a method of learning a feature space in which information of the speaker can be divisionally represented in the hidden layer in such a manner that the speaker feature vector extraction model is trained to classify speakers in the sequence of the acoustic features extracted from utterance having a given length. An equation of the loss function used to train the speaker feature vector extraction model may be represented as follows.

$$L_x = \frac{1}{N}\sum_{n=1}^{N} -\log(p_{y_n}) \text{ where } p_{y_s} = \frac{\exp(s_{y_n})}{\sum_{j=1}^{C}\exp(s_j)} \quad \text{[Equation 2]}$$

wherein C is the number of speakers within a training database. $s_j$ is an output value of the neural network calculated at the location of a j-th speaker among the nodes of the output layer. $p_j$ is a value to which a probabilistic meaning has been assigned by applying a softmax function to $s_j$. Furthermore, $y_n$ is an index indicative of the speaker of an n-th training data sample (target) constituting the mini-batch.

After the training is finished, the output value may be used as the x-vector, that is, a speaker feature vector, before passing through the activation function of the hidden layer located right next to the statistical feature extraction layer.

In step 230, the joint modeling unit 330 may connect the output layer of the feature enhancement model and the input layer of the speaker feature vector extraction model. Furthermore, in step 240, the joint training unit 340 may perform joint training in which the connected feature enhancement model and speaker feature vector extraction model are additionally trained by considering the connected feature enhancement model and speaker feature vector extraction model as a single model.

In the present disclosure, since both the feature enhancement model and the speaker feature vector extraction model are deep neural network models, the joint modeling unit 330 may connect the output layer of the feature enhancement model and the input layer of the speaker feature vector extraction model. The joint training unit 340 may perform joint training in which the connected two models are additionally trained by considering the connected two models as a single model. An object of the joint training is to improve overall performance of the system through a process of connecting the individual models trained using the different loss functions and then generally optimizing the two models connected by one loss function. Such a method of performing the joint training after the deep neural network-based feature enhancement model and the deep neural network-based speaker feature vector extraction model are jointed together, which has been used in the present disclosure, is a method that has never been researched.

Moreover, in step 240, the joint training unit 340 may perform the joint training by using a modified loss function to which a margin has been applied.

As described above, the speaker feature vector extraction model used in the present disclosure may be trained to classify speakers within a training dataset. In this case, a penalty may be assigned to a target speaker log it by subtracting, from the target speaker log it, a margin corresponding to a specific constant value. In this case, there is an effect in that the speaker feature vector extraction model can be trained more robustly because a target value to be overcome by the speaker feature vector extraction model that needs to be trained so that the posteriori probability of the target speaker is increased in the training process is forced to become more difficult. The following equation indicates the modified loss function in which a margin has been applied to [Equation 2].

[Equation 3]
$$L_x = \frac{1}{N}\sum_{n=1}^{N} -\log(p_{y_n}) \text{ where } p_{y_s} = \frac{\exp(s_{y_n} - m)}{\exp(s_{y_n} - m) + \Sigma_{i \neq y_n}\exp(s_j)}$$

wherein $y_n$ is the index of the target speaker. $s_{y_n}$ is a log it value of the target speaker. $p_{y_n}$ is a classification probability of the target speaker. m is a margin having a positive sign, which is subtracted from an output value of the output layer of the neural network. The loss function may be modified in a way to subtract the margin from the output value corresponding to the speaker index of a data sample in a process of applying the softmax function as in the equation.

Figure 4:
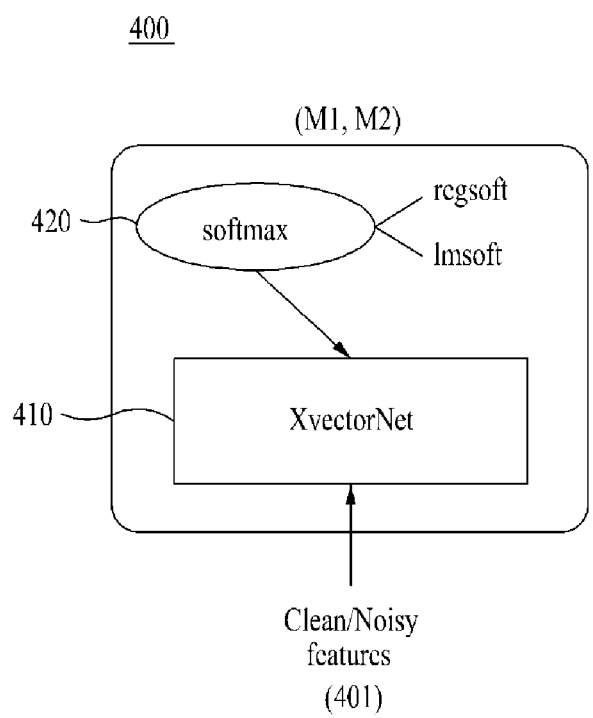
FIG. 4 is a diagram illustrating methods used as a control group according to an embodiment of the present disclosure.
Figure 5:
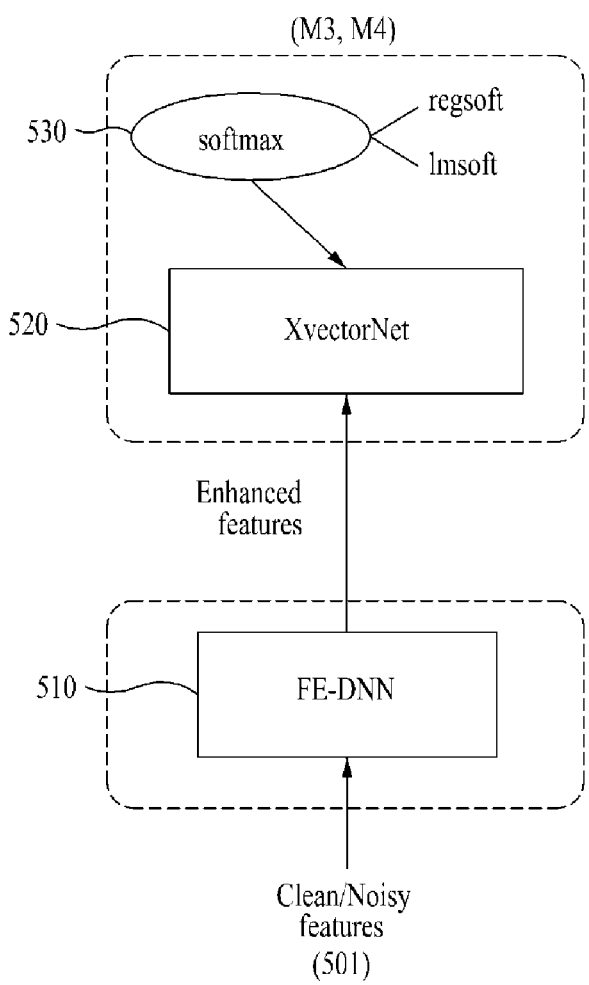
FIG. 5 is a diagram illustrating methods used as another control group according to an embodiment of the present disclosure.
Figure 6:
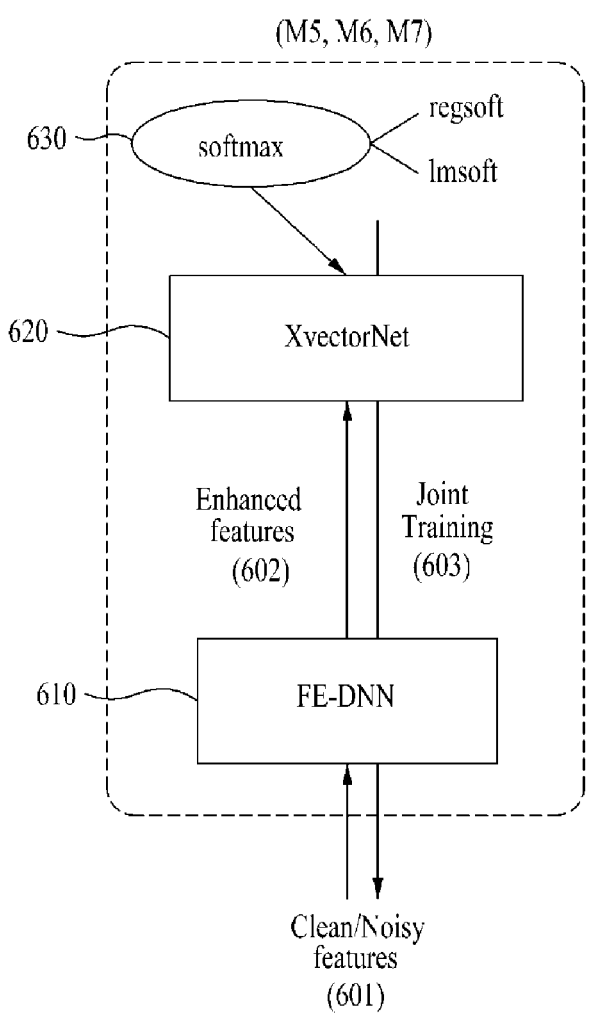
FIG. 6 is a diagram illustrating a joint training method using deep neural network-based feature enhancement and a modified loss function according to an embodiment of the present disclosure.

FIG. 4 is a diagram illustrating methods used as a control group according to an embodiment of the present disclosure. FIG. 5 is a diagram illustrating methods used as another control group according to an embodiment of the present disclosure. FIG. 6 is a diagram illustrating a joint training method using deep neural network-based feature enhancement and a modified loss function according to an embodiment of the present disclosure.

FIGS. 4 to 6 are diagrams represented to illustrate a method proposed in experiments of the present disclosure and methods used as a control group. In this case, an FE-DNN indicates a deep neural network-based feature enhancement model 510, 610 used in feature enhancement. XvectorNet indicates a deep neural network-based speaker feature vector extraction model 410, 520, 620 trained to extract an x-vector, that is, a speaker feature vector.

Furthermore, a softmax block 420, 530, 630 means that a method to be used for training can be selected among common softmax(=regsoft) to which a margin has not been applied or softmax(=lmsoft) to which a margin has been applied.

First, FIG. 4 illustrates a case where the deep neural network-based speaker feature vector extraction model (XvectorNet) 410 is trained by using, without any change, MFBE features 401 extracted from a degraded voice without feature enhancement. In this case, a method to be used for training, among common softmax(=regsoft) to which a margin has not been applied or softmax(=lmsoft) to which a margin has been applied, may be selected in the softmax block 420. The softmax block 420 may divide the softmax into M1 (margin not applied) and M2 (margin applied) depending on whether a margin is applied.

FIG. 5 illustrates a case where a feature enhancement (enhanced features) process of converting MFBE features 501, extracted from a degraded voice, into features extracted from a clean voice is performed by using the deep neural network-based feature enhancement model (FE-DNN) 510 and the deep neural network-based speaker feature vector extraction model (XvectorNet) 520 is trained using the converted MFBE features. In this case, the softmax block 530 may divide the softmax into M3 (margin not applied) and M4 (margin applied) depending on whether a margin is applied.

Referring to FIG. 6, a feature enhancement (enhanced features) process, 602) process of converting MFBE features 601, extracted from a degraded voice, into features extracted from a clean voice is performed by using the deep neural network-based feature enhancement model (FE-DNN) 610. The deep neural network-based speaker feature vector extraction model (XvectorNet) 620 may be trained using the converted MFBE features.

FIG. 6 illustrates a case where the individually trained deep neural network-based feature enhancement model (FE-DNN) 610 and deep neural network-based speaker feature vector extraction model (XvectorNet) 620 are additionally joint-trained (603). In this case, the joint training 603 means that the deep neural network-based feature enhancement model (FE-DNN) 610 and the deep neural network-based speaker feature vector extraction model (XvectorNet) 620 are additionally joint-trained (603) by using the loss function of [Equation 2] or [Equation 3].

In this case, the softmax block 630 may divide the softmax into M5, M6, and M7 depending on whether a margin is applied in the step of individually training the deep neural network-based speaker feature vector extraction model (XvectorNet) 620 and the joint training (603) step.

As described in Table 1 below, training was performed by not applying a margin to both the individual training of the deep neural network-based speaker feature vector extraction model (XvectorNet) 620 and the joint training 603 in M5, by applying a margin to the joint training 603 of the deep neural network-based speaker feature vector extraction model (XvectorNet) 620 in M6, and by applying a margin to both the individual training of the deep neural network-based speaker feature vector extraction model (XvectorNet) 620 and the joint training 603 in M7.

Hereinafter, the combined learning method and apparatus using deep neural network-based feature enhancement and a modified loss function according to the present disclosure are verified through experiments. The experiments were performed using clean Korean voice data consisting of a total of 1,000 speakers. The number of pieces of utterance for each speaker was 103 to 105. All of the pieces of utterance were sampled at a sampling frequency of 16 kHz, and each have an average length of 5.18 second.

Bus, cafe, pedestrian, and street noise samples of a CHiME3 dataset and music noise samples of a MUSAN dataset were used as noise signals used in the experiments. The experiment were performed in various background noise environments by synthesizing the noise signals, clean Korean voice data at the SNRs of −5, 0, 5, 10, and 15 dB.

Pieces of 503,027 utterance of 800 speakers were used for the training of the model. For evaluation, a total of 285,850 trials were constructed by randomly selecting every pieces of 25 utterance from 200 speakers. Among the 200 speakers, the number of target trials having the same speaker was 60,000, and the number of non-target trials not having the same speaker was 221,850. All the trials were composed of only the same gender.

Table 1 illustrates a model classification table according to the training method.

TABLE 1

| Model | Training Procedure |
|---|---|
| M1 | raw + XvectorNet (regsoft) |
| M2 | raw + XvectorNet (lmsoft) |
| M3 | FE + XveclorNet (regsoft) |
| M4 | FE + XvectorNet (lmsoft) |
| M5 | FE + XvectorNet (regsoft) + JT (regsfoft) |
| M6 | FE + XvectorNet (regsoft) + JT (lmsoft) |
| M7 | FE + XvectorNet (lmsoft) + JT (lmsoft) |

Table 1 is a table illustrating various model training methods including the joint training proposed in the present disclosure and a modified loss function to which a margin has been added. In the table, the most left column is used to denote the names of models trained using different methods. "raw" means that acoustic features extracted in a frame unit from a voice degraded by noise without applying feature enhancement is used to train XvectorNet, that is, the speaker feature vector extraction model, without any change. "FE" means that feature enhancement has been applied. Furthermore, "JT" means that joint training has been additionally performed. Furthermore, "regsoft" and "lmsoft" indicate a case where a loss function to which a margin has not been applied is used and a case where a modified loss function to which a margin has been applied is used, respectively.

The following tables illustrate the results of the experiments, and are tables illustrating equal error rates (EERs) % for each model when the SNRs are −5 dB, 0 dB, 5 dB, 10 dB, and 15 dB, respectively.

Table 2 illustrates EER (%) comparison results in the SNR −5 dB environment.

TABLE 2

| Condition | M1 | M2 | M3 | M4 | M5 | M6 | M7 |
|---|---|---|---|---|---|---|---|
| Bus-Bus | 3.348 | 3.163 | 3.434 | 3.311 | 3.348 | 2.881 | 3.285 |
| Bus-Caf | 8.980 | 8.631 | 9.144 | 9.014 | 8.829 | 7.927 | 8.819 |
| Bus-Ped | 8.987 | 8.626 | 9.908 | 9.702 | 9.454 | 8.686 | 9.442 |
| Bus-Str | 4.952 | 4.721 | 5.217 | 5.021 | 4.997 | 4.439 | 5.033 |
| Bus-Mus | 7.825 | 7.434 | 8.564 | 8.285 | 8.112 | 7.084 | 7.886 |
| Caf-Caf | 11.301 | 10.801 | 11.545 | 11.448 | 11.360 | 10.545 | 11.076 |
| Caf-Ped | 11.156 | 10.651 | 11.831 | 11.644 | 11.561 | 11.032 | 11.301 |
| Caf-Str | 8.757 | 8.300 | 8.873 | 8.724 | 8.719 | 8.122 | 8.589 |
| Caf-Mus | 11.841 | 11.307 | 12.855 | 12.674 | 12.235 | 11.055 | 12.056 |
| Ped-Ped | 11.075 | 10.798 | 12.156 | 12.153 | 11.715 | 11.337 | 11.699 |
| Ped-Str | 8.984 | 8.616 | 9.744 | 9.531 | 9.490 | 8.962 | 9.311 |
| Ped-Mus | 12.104 | 11.632 | 13.457 | 13.291 | 12.789 | 11.822 | 12.748 |
| Str-Str | 5.643 | 5.398 | 5.785 | 5.656 | 5.667 | 5.235 | 5.619 |
| Str-Mus | 8.725 | 8.243 | 9.476 | 9.198 | 9.051 | 8.134 | 8.834 |
| Mus-Mus | 11.345 | 10.684 | 12.549 | 12.148 | 11.858 | 10.340 | 11.375 |

Table 3 illustrates EER (%) comparison results in the SNR 0 dB environment.

TABLE 3

| Condition | M1 | M2 | M3 | M4 | M5 | M6 | M7 |
|---|---|---|---|---|---|---|---|
| Bus-Bus | 2.026 | 1.950 | 2.103 | 2.032 | 2.047 | 1.762 | 2.051 |
| Bus-Caf | 4.079 | 3.906 | 4.241 | 4.148 | 4.072 | 3.451 | 4.027 |
| Bus-Ped | 3.354 | 3.218 | 3.708 | 3.587 | 3.546 | 3.043 | 3.551 |
| Bus-Str | 2.580 | 2.460 | 2.731 | 2.634 | 2.646 | 2.244 | 2.657 |
| Bus-Mus | 3.495 | 3.367 | 3.863 | 3.713 | 3.603 | 3.117 | 3.596 |
| Caf-Caf | 5.272 | 4.944 | 5.242 | 5.159 | 5.176 | 4.486 | 5.045 |
| Caf-Ped | 4.640 | 4.500 | 4.876 | 4.732 | 4.776 | 4.253 | 4.675 |
| Caf-Str | 4.099 | 3.957 | 4.099 | 3.976 | 4.038 | 3.530 | 3.967 |
| Caf-Mus | 5.328 | 5.071 | 5.971 | 5.796 | 5.650 | 4.724 | 5.562 |
| Ped-Ped | 4.175 | 40.51 | 4.546 | 4.411 | 4.418 | 3.871 | 4.351 |
| Ped-Str | 3.613 | 3.468 | 3.816 | 3.666 | 3.738 | 3.238 | 3.716 |
| Ped-Mus | 4.737 | 4.481 | 5.318 | 5.227 | 5.033 | 4.251 | 5.062 |
| Str-Str | 2.935 | 2.788 | 3.064 | 2.974 | 2.959 | 2.588 | 2.997 |
| Str-Mus | 3.987 | 3.750 | 4.401 | 4.253 | 4.117 | 3.506 | 4.149 |
| Mus-Mus | 5.137 | 4.815 | 5.794 | 5.588 | 5.387 | 4.521 | 5.318 |

Table 4 illustrates EER (%) comparison results in the SNR 5 dB environment.

TABLE 4

| Condition | M1 | M2 | M3 | M4 | M5 | M6 | M7 |
|---|---|---|---|---|---|---|---|
| Bus-Bus | 1.462 | 1.407 | 1.578 | 1.515 | 1.572 | 1.401 | 1.564 |
| Bus-Caf | 2.345 | 2.248 | 2.563 | 2.436 | 2.517 | 2.066 | 2.048 |
| Bus-Ped | 1.918 | 1.844 | 2.139 | 2.101 | 2.123 | 1.780 | 2.093 |
| Bus-Str | 1.667 | 1.617 | 1.813 | 1.813 | 1.826 | 1.545 | 1.815 |
| Bus-Mus | 2.049 | 1.960 | 2.289 | 2.271 | 2.270 | 1.895 | 2.233 |
| Caf-Caf | 2.974 | 2.810 | 3.071 | 3.010 | 3.061 | 2.595 | 2.982 |
| Caf-Ped | 2.662 | 2.551 | 2.759 | 2.694 | 2.769 | 2.343 | 2.712 |
| Caf-Str | 2.388 | 2.278 | 2.484 | 2.449 | 2.491 | 2.073 | 2.461 |
| Caf-Mus | 3.013 | 2.844 | 3.357 | 3.321 | 3.252 | 2.641 | 3.237 |
| Ped-Ped | 2.313 | 2.244 | 2.550 | 2.437 | 2.534 | 2.114 | 2.437 |
| Ped-Str | 2.097 | 2.004 | 2.270 | 2.172 | 2.240 | 1.889 | 2.182 |
| Ped-Mus | 2.540 | 2.417 | 2.900 | 2.882 | 2.771 | 2.354 | 2.808 |
| Str-Str | 1.827 | 1.757 | 1.931 | 1.870 | 1.930 | 1.649 | 1.906 |
| Str-Mus | 2.250 | 2.171 | 2.480 | 2.505 | 2.441 | 2.059 | 2.462 |
| Mus-Mus | 2.769 | 2.638 | 3.200 | 3.194 | 3.029 | 2.539 | 3.030 |

Table 5 illustrates EER (%) comparison results in the SNR 10 dB environment.

TABLE 5

| Condition | M1 | M2 | M3 | M4 | M5 | M6 | M7 |
|---|---|---|---|---|---|---|---|
| Bus-Bus | 1.343 | 1.267 | 1.414 | 1.367 | 1.425 | 1.232 | 1.389 |
| Bus-Caf | 1.760 | 1.649 | 1.941 | 1.846 | 1.887 | 1.572 | 1.877 |
| Bus-Ped | 1.534 | 1.434 | 1.652 | 1.581 | 1.647 | 1.399 | 1.640 |
| Bus-Str | 1.408 | 1.337 | 1.487 | 1.454 | 1.484 | 1.302 | 1.509 |
| Bus-Mus | 1.537 | 1.482 | 1.708 | 1.634 | 1.689 | 1.436 | 1.661 |
| Caf-Caf | 2.017 | 1.936 | 2.135 | 2.108 | 2.140 | 1.800 | 2.094 |
| Caf-Ped | 1.850 | 1.768 | 1.985 | 1.905 | 1.991 | 1.694 | 1.935 |
| Caf-Str | 1.715 | 1.607 | 1.811 | 1.770 | 1.804 | 1.591 | 1.826 |
| Caf-Mus | 2.022 | 1.910 | 2.260 | 2.202 | 2.187 | 1.847 | 2.185 |
| Ped-Ped | 1.662 | 1.548 | 1.787 | 1.685 | 1.748 | 1.501 | 1.728 |
| Ped-Str | 1.531 | 1.449 | 1.630 | 1.576 | 1.618 | 1.404 | 1.630 |
| Ped-Mus | 1.728 | 1.666 | 1.941 | 1.845 | 1.895 | 1.620 | 1.884 |
| Str-Str | 1.456 | 1.378 | 1.524 | 1.488 | 1.517 | 1.345 | 1.542 |
| Str-Mus | 1.653 | 1.579 | 1.802 | 1.760 | 1.748 | 1.543 | 1.789 |
| Mus-Mus | 1.835 | 1.792 | 2.075 | 2.015 | 1.992 | 1.688 | 1.998 |

Table 6 illustrates EER (%) comparison results in the SNR 15 dB environment.

TABLE 6

| Condition | M1 | M2 | M3 | M4 | M5 | M6 | M7 |
|---|---|---|---|---|---|---|---|
| Bus-Bus | 1.250 | 1.179 | 1.284 | 1.261 | 1.318 | 1.183 | 1.306 |
| Bus-Caf | 1.457 | 1.404 | 1.569 | 1.520 | 1.586 | 1.354 | 1.543 |
| Bus-Ped | 1.320 | 1.253 | 1.379 | 1.355 | 1.431 | 1.265 | 1.390 |
| Bus-Str | 1.283 | 1.226 | 1.333 | 1.330 | 1.380 | 1.225 | 1.396 |
| Bus-Mus | 1.358 | 1.314 | 1.467 | 1.443 | 1.470 | 1.314 | 1.470 |
| Caf-Caf | 1.615 | 1.518 | 1.701 | 1.644 | 1.693 | 1.469 | 1.660 |
| Caf-Ped | 1.485 | 1.402 | 1.568 | 1.522 | 1.567 | 1.388 | 1.552 |
| Caf-Str | 1.439 | 1.353 | 1.509 | 1.479 | 1.546 | 1.368 | 1.531 |
| Caf-Mus | 1.581 | 1.516 | 1.754 | 1.688 | 1.748 | 1.529 | 1.704 |
| Ped-Ped | 1.372 | 1.313 | 1.447 | 1.429 | 1.460 | 1.307 | 1.479 |
| Ped-Str | 1.345 | 1.274 | 1.412 | 1.407 | 1.429 | 1.272 | 1.452 |
| Ped-Mus | 1.423 | 1.360 | 1.562 | 1.568 | 1.575 | 1.370 | 1.595 |
| Str-Str | 1.347 | 1.238 | 1.373 | 1.371 | 1.401 | 1.260 | 1.417 |
| Str-Mus | 1.418 | 1.342 | 1.530 | 1.518 | 1.534 | 1.336 | 1.547 |
| Mus-Mus | 1.493 | 1.459 | 1.696 | 1.658 | 1.679 | 1.432 | 1.643 |

In Tables 2 to 6. Bus, Caf, Ped, Str, and Mus mean bus, cafe, pedestrian, street, and music noise environments, respectively. The contents of analysis of experiment results arranged through the tables are as follows.

Performance in a case where a margin was not applied and performance in a case where a margin was applied when the loss function used to train XvectorNet was constructed may be compared by comparing M1 and M2 or comparing M3 and M4. The latter always had more excellent performance than the latter.

Performance in a case where the feature enhancement model and the speaker feature vector model were individually trained and were then additionally not joint-training and performance in a case where the feature enhancement model and the speaker feature vector model were individually trained and were then additionally joint-training may be compared by comparing M3 and M5 or comparing M4 and M7. When the joint training was applied, the EER was slightly decreased in low SNR environments (−5 dB and 0 dB), whereas the EER was slightly increased in high SNR environments (10 dB and 15 dB).

Furthermore, performance in a case where feature enhancement was not applied and performance in a case where feature enhancement was applied may be compared by comparing M1 and M3 or comparing M1 and M5. The case where feature enhancement was not applied had a lower EER. Accordingly, it can be seen that performance before feature enhancement is applied is better because a speaker feature component is distorted if a noise component inherent in an MFBE feature is removed using the feature enhancement method.

M4 and M5 showed similar performance. M5 showed a slightly lower EER in the low SNR environment, and M4 showed a further lower EER in the high SNR environment.

Furthermore, performance in a case where a loss function to which a margin was not applied and performance in a case where a loss function to which a margin was applied when XvectorNet was individually trained, among methods of performing joint training by using a loss function to which a margin was applied, may be compared by comparing M6 and M7. As may be seen from the table, M6 has more excellent performance than M7 in all the environments.

It may be seen that a case where feature enhancement was not applied has a lower EER than a case where a modified loss function to which a margin was applied in both the individual training of XvectorNet and the joint training by comparing M2 and M7 in the tables.

Finally, it may be seen that M2 has more excellent performance than M6 in some conditions, but the distortion of a speaker feature component generated due to the feature enhancement model has been generally overcome when the feature enhancement neural network and the speaker feature extraction neural network were simultaneously optimized using the modified loss function only in the joint training process by comparing M2 and M6 in the tables.

The present disclosure relates to the deep neural network-based pre-processing technology for speaker recognition robust against noise environments, and technical fields related thereto include speaker recognition for an artificial intelligence speaker, speaker recognition for a robot, voice recognition, etc. The proposed disclosure may be used in an artificial intelligence speaker, a robot, a portable terminal type user authentication system, etc. That is, performance of a speaker recognizer can be improved by applying the proposed disclosure to an artificial intelligence speaker, a robot, or a portable terminal type user authentication system that needs to perform speaker recognition in an environment in which background noise is present. A voice recognition rate can be improved by identically applying the method proposed in the present disclosure to an acoustic model and a deep neural network-based pre-processing technology for voice recognition when the acoustic model and the pre-processing technology are combined.

The aforementioned apparatus may be implemented by a hardware component, a software component or a combination of a hardware component and a software component. For example, the apparatus and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other apparatus capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, a different processing configuration, such as a parallel processor, is also possible.

Software may include a computer program, a code, an instruction or a combination of one or more of them and may configure a processing apparatus so that the processing apparatus operates as desired or may instruct the processing apparatuses independently or collectively. The software and/or the data may be embodied in any type of machine, a component, a physical apparatus, a computer storage medium or an apparatus in order to be interpreted by the processor or to provide an instruction or data to the processing apparatus. The software may be distributed to computer systems connected over a network and may be stored or executed in a distributed manner. The software and the data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instruction stored in the medium may be specially designed and constructed for an embodiment, or may be known and available to those skilled in the computer software field. Examples of the computer-readable medium include magnetic media such as a hard disk, a floppy disk and a magnetic tape, optical media such as a CD-ROM and a DVD, magneto-optical media such as a floptical disk, and hardware apparatuses specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, apparatus, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A joint training method using deep neural network-based feature enhancement and a modified loss function, comprising:
   training a deep neural network-based feature enhancement model;
   training a deep neural network-based speaker feature vector extraction model;
   connecting an output layer of the deep neural network-based feature enhancement model and an input layer of the deep neural network-based speaker feature vector extraction model; and
   performing joint training in which the connected deep neural network-based feature enhancement model and speaker feature vector extraction model are additionally trained by considering the connected deep neural network-based feature enhancement model and speaker feature vector extraction model as a single model,
   wherein the training the deep neural network-based feature enhancement model comprises:
   extracting acoustic features from degraded voice data and clean voice data;
   using the extracted acoustic features for an input to the deep neural network-based feature enhancement model; and
   training, by using a first loss function, the deep neural network-based feature enhancement model so that enhanced acoustic features outputted by passing the extracted acoustic features through the deep neural network-based feature enhancement model have values similar to those of previously-prepared clean acoustic features.

2. The joint training method of claim 1, wherein the training the deep neural network-based speaker feature vector extraction model comprises:
   generating enhanced acoustic features by passing the extracted acoustic features through the deep neural network-based feature enhancement model that has learnt all of training datasets;
   using the enhanced acoustic features for an input to the deep neural network-based speaker feature vector extraction model; and
   training, by using a second loss function, the deep neural network-based speaker feature vector extraction model so that speakers are classified in a sequence of acoustic features extracted from utterance having a given length by passing the enhanced acoustic features through the deep neural network-based speaker feature vector extraction model.

3. The joint training method of claim 2, wherein the training the deep neural network-based speaker feature vector extraction model comprises training the deep neural network-based speaker feature vector extraction model by using an x-vector model as the deep neural network-based speaker feature vector extraction model.

4. The joint training method of claim 3, wherein the training the deep neural network-based speaker feature vector extraction model comprises:
   extracting, by the x-vector model, information related to speakers from a sequence of acoustic features of a frame unit arranged in a time order through a non-linear operation by using five time-delay neural network (TDNN) layers;
   extracting a vector having a fixed length from utterance having a given length in a way to calculate and joint together a mean and standard deviation of the sequence of the acoustic features in a time axis in a statistical feature extraction layer; and
   training, by using a cross-entropy second loss function, the deep neural network-based speaker feature vector extraction model so that speakers within a training dataset are classified in the output layer after the mean and standard deviation vector additionally pass through two hidden layers.

5. The joint training method of claim 4, wherein the training the deep neural network-based speaker feature vector extraction model comprises using, as an x-vector that is a speaker feature vector, an output value before passing through an activation function of the hidden layer located right next to the statistical feature extraction layer after the training is finished.

6. The joint training method of claim 1, wherein the performing joint training in which the connected deep neural network-based feature enhancement model and speaker feature vector extraction model are additionally trained by considering the connected deep neural network-based feature enhancement model and speaker feature vector extraction model as a single model comprises:
  connecting the individual feature enhancement model and speaker feature vector extraction model trained using different loss functions, and
  then generally optimizing, through the joint training, the two feature enhancement model and speaker feature vector extraction model connected by one loss function.

7. The joint training method of claim 4, wherein the performing joint training in which the connected deep neural network-based feature enhancement model and speaker feature vector extraction model are additionally trained by considering the connected deep neural network-based feature enhancement model and speaker feature vector extraction model as a single model comprises performing the joint training by modifying the second loss function in a way to subtract a margin, corresponding to a specific constant value, from an output value corresponding to a speaker index of the deep neural network-based speaker feature vector extraction model in order to perform the joint training so that a posteriori probability of a speaker is increased.

8. A joint training apparatus using deep neural network-based feature enhancement and a modified loss function, the joint training apparatus comprising:
  a feature enhancement model training unit configured to train a deep neural network-based feature enhancement model;
  a speaker feature vector extraction model training unit configured to train a deep neural network-based speaker feature vector extraction model;
  a joint modeling unit configured to connect an output layer of the deep neural network-based feature enhancement model and an input layer of the deep neural network-based speaker feature vector extraction model; and
  a joint training unit configured to perform joint training in which the connected deep neural network-based feature enhancement model and speaker feature vector extraction model are additionally trained by considering the connected deep neural network-based feature enhancement model and speaker feature vector extraction model as a single model,
  wherein the feature enhancement model training unit is further configured to:
    extract acoustic features from degraded voice data and clean voice data,
    use the extracted acoustic features for an input to the deep neural network-based feature enhancement model, and
    train, by using a first loss function, the deep neural network-based feature enhancement model so that enhanced acoustic features outputted by passing the extracted acoustic features through the deep neural network-based feature enhancement model have values similar to those of previously-prepared clean acoustic feature.

9. The joint training apparatus of claim 8, wherein the deep neural network-based speaker feature vector extraction model training unit is further configured to:
  generate the enhanced acoustic features by passing the extracted acoustic features through the deep neural network-based feature enhancement model that has learnt all of training datasets,
  use the enhanced acoustic features for an input to the deep neural network-based speaker feature vector extraction model, and
  train, by using a second loss function, the deep neural network-based speaker feature vector extraction model so that speakers are classified in a sequence of acoustic features extracted from utterance having a given length by passing the enhanced acoustic features through the deep neural network-based speaker feature vector extraction model.

10. The joint training apparatus of claim 9, wherein:
  the deep neural network-based speaker feature vector extraction model training unit is further configured to train the deep neural network-based speaker feature vector extraction model by using an x-vector model as the deep neural network-based speaker feature vector extraction model, and
  the x-vector model is configured to:
    extract information related to speakers from a sequence of acoustic features of a frame unit arranged in a time order through a non-linear operation by using five time-delay neural network (TDNN) layers,
    extract a vector having a fixed length from utterance having a given length in a way to calculate and joint together a mean and standard deviation of the sequence of the acoustic features in a time axis in a statistical feature extraction layer, and
    train, by using a cross-entropy second loss function, the deep neural network-based speaker feature vector extraction model so that speakers within a training dataset are classified in the output layer after the mean and standard deviation vector additionally pass through two hidden layers.

11. The joint training apparatus of claim 10, wherein the deep neural network-based speaker feature vector extraction model training unit is configured to use, as an x-vector that is a speaker feature vector, an output value before passing through an activation function of the hidden layer located right next to the statistical feature extraction layer after the training is finished.

12. The joint training apparatus of claim 8, wherein the joint training unit is further configured to:
  connect the individual feature enhancement model and speaker feature vector extraction model trained using different loss functions, and
  then generally optimize, through the joint training, the two feature enhancement model and speaker feature vector extraction model connected by one loss function.

13. The joint training apparatus of claim 10, wherein the joint training unit is further configured to perform the joint training by modifying the second loss function in a way to subtract a margin, corresponding to a specific constant value, from an output value corresponding to a speaker index of the deep neural network-based speaker feature vector extraction model in order to perform the joint training so that a posteriori probability of a speaker is increased.

14. A joint training method using deep neural network-based feature enhancement and a modified loss function, the joint training method comprising:
  training a deep neural network-based feature enhancement model;
  training a deep neural network-based speaker feature vector extraction model;

connecting an output layer of the deep neural network-based feature enhancement model and an input layer of the deep neural network-based speaker feature vector extraction model; and performing joint training in which the connected deep neural network-based feature enhancement model and speaker feature vector extraction model are additionally trained by considering the connected deep neural network-based feature enhancement model and speaker feature vector extraction model as a single model, wherein the training the deep neural network-based speaker feature vector extraction model comprises:

generating enhanced acoustic features by passing the extracted acoustic features through the deep neural network-based feature enhancement model that has learnt all of training datasets;

using the enhanced acoustic features for an input to the deep neural network-based speaker feature vector extraction model; and training, by using a loss function, the deep neural network-based speaker feature vector extraction model so that speakers are classified in a sequence of acoustic features extracted from utterance having a given length by passing the enhanced acoustic features through the deep neural network-based speaker feature vector extraction model.

* * * * *